United States Patent Office 3,618,293
Patented Nov. 9, 1971

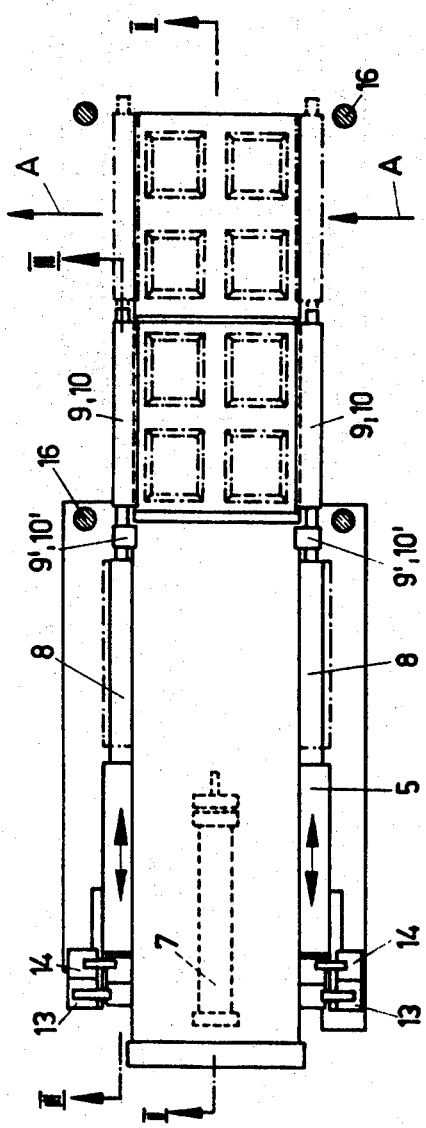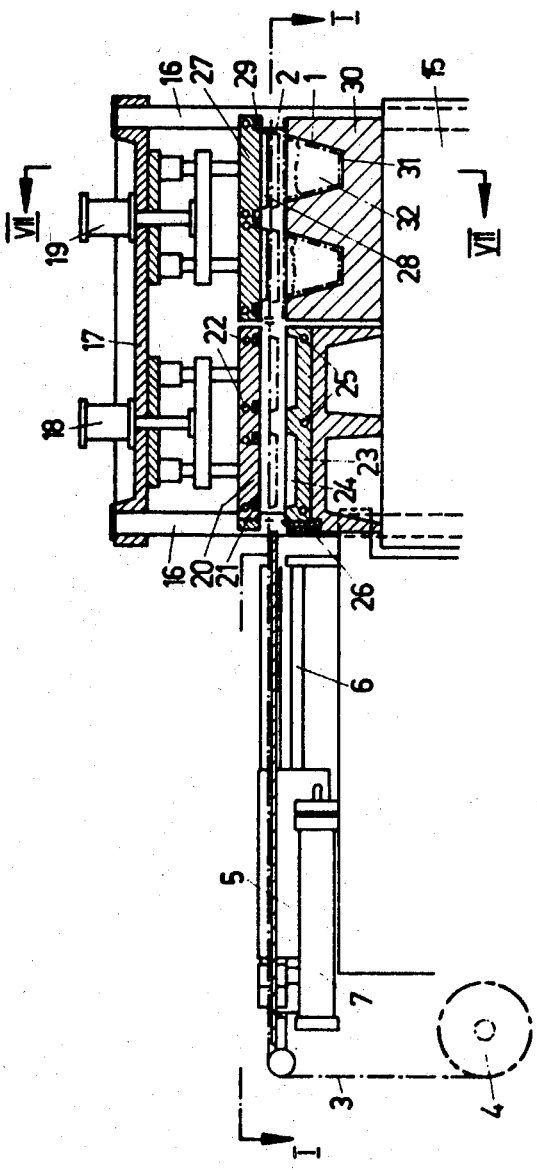

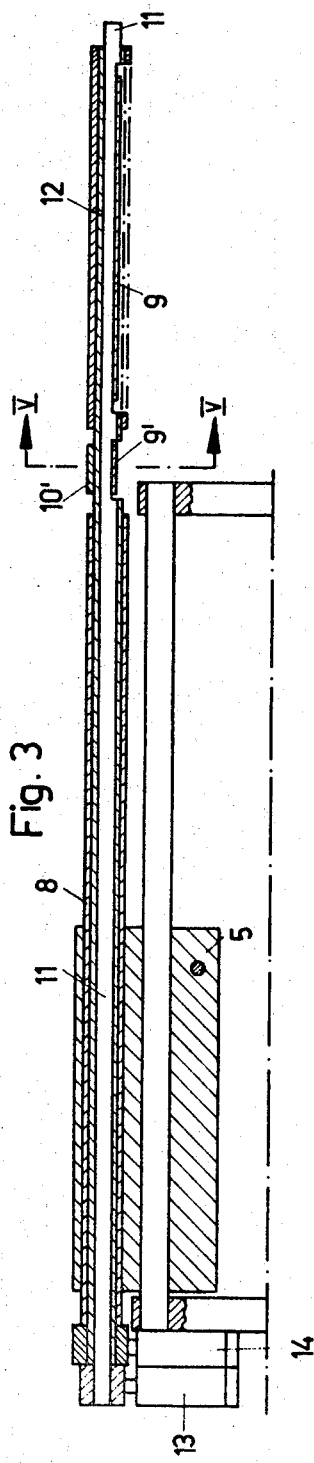
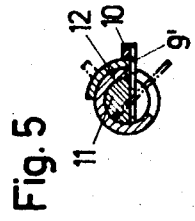
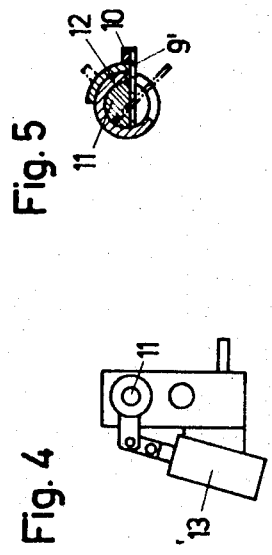

3,618,293
MACHINE FOR SEALING CONTAINERS WITH COVERS MOLDER FROM SYNTHETIC PLASTIC SHEET
Horst Loewenthal, Tiengen, Germany, assignor to Schweizerische Industrie-Gesellschaft, Neuhausen am Rheinfall, Switzerland
Filed July 25, 1969, Ser. No. 845,007
Claims priority, application Switzerland, July 31, 1968, 11,456/68
Int. Cl. B65b 7/28, 3/02
U.S. Cl. 53—296
2 Claims

ABSTRACT OF THE DISCLOSURE

Thermoplastic sheeting is moved to a first work station at which a length of the sheet is molded into covers and then to a second adjacent work station at which the filled containers are covered with the freshly molded covers, which heating elements immediately weld to the containers.

BACKGROUND OF THE INVENTION

The invention relates to a machine for closing containers with covers molded from plastic sheet, the sheet being advanced by grippers to the one or more work stations.

Among the packaging machines of the prior art are those in which a row of filled containers are sealed shut by welding a covering sheet to the containers. The covering sheet is drawn from a supply roll, moved by grippers over the opening of the container, and sealed to the horizontally projecting rim of the latter by a heated tool.

The container thus sealed shut is very suitable for holding a small quantity, such as a single portion of jam; but it does have the disadvantage that it cannot be shut once the covering sheet is torn open.

SUMMARY OF THE INVENTION

The machine of the invention enables a row of filled containers to be sealed shut automatically with a molded cover that can be reused to close the container once opened. Containers with these kinds of covers are known, but up to the present time it has not been found possible to mold the covers out of a sheet of synthetic plastic at the machine and to place the freshly molded covers immediately on the containers.

BRIEF DESCRIPTION OF THE DRAWINGS

The invention will be described, with reference to the schematic figures of the drawings, wherein:

FIG. 1 is a top view, taken along line I—I of FIG. 2, of the machine of the invention;

FIG. 2 is a side view of the machine, taken along line II—II of FIG. 1;

FIG. 3 is a longitudinal section, taken along line III—III of FIG. 1, of two pairs of jaws of the feed grippers;

FIG. 4 is a front view of an operating cylinder for the grippers on one side of the machine;

FIG. 5 is a view in cross section taken along line V—V of FIG. 3; and

DESCRIPTION OF THE PREFERRED EMBODIMENTS

Figure 6A:
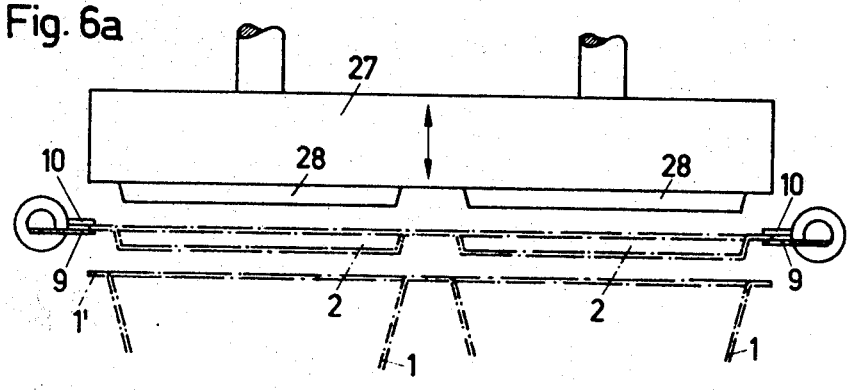
FIGS. 6a to 6c are views in cross section, taken along line VII—VII of FIG. 2, of three successive stages during the sealing of the containers.

As shown in FIGS. 1 and 2, containers 1 are moved along a conveying path, suggested by the arrows A, through a machine that provides the containers with a cover 2, which the machine itself makes. In the present case, the containers are simultaneously sealed in groups of four.

The machine comprises a feeding device for thermoplastic sheeting 3, which is drawn from a supply roll 4, and the actual tools for forming the covers and for covering and sealing the containers. The synthetic plastic sheet is fed to these tools transversely to the direction of the conveying path A.

Two pairs of grippers are arranged on a carriage 5, which moves on rails 6 (FIG. 2) and is driven by the piston rod of a pneumatic cylinder 7. The grippers comprise two lower pairs of jaws 9 and 9' and two upper pairs of jaws 10 and 10' (see FIGS. 3 to 5) for grasping the sheet 3. The jaws 9 and 9' are mounted on a respective rod 11, and the jaws 10 and 10' on a respective pipe 12 that is coaxial with the rod and held coaxially in a guide pipe 8 free to turn therein, the guide pipe being held by the carriage 5, as shown in FIG. 3. A respective pneumatic cylinder unit 13, shown in FIGS. 3 and 4, is provided to turn each rod 11 and its jaws 9 and 9'. Two second pneumatic cylinder units 14 serve to turn a respective pipe 12 with its jaws 10 and 10'.

The respective work stations for molding the covers and sealing them to the containers are located side by side.

As shown in FIG. 2, these two work stations have a common, vertically adjustable work table 15 incorporating a common drive, not shown, for the tools of the two work stations. The columns 16 support a horizontal plate 17, which carries the operating cylinders 18 and 19 for the upper members of the tools, which are also vertically adjustable.

The first work station molds the cover 2, and comprises an upper molding member 20, the lower face of which has a heating winding 21 that directly contacts the sheet 3 and is located at those position at which the sheet is to be molded into covers. The upper member 20 also embodies passages 22 for cooling air or water, which prevents the parts of the upper member outside of the heating winding from becoming hot. The lower molding member 23 incorporates recesses 24 that correspond to the shape of the finished cover. The member 23 also contains passages 25 for cooling air or water, to keep this member as cool as possible. A knife 26 is arranged on the lower member 23.

The cover is molded in the following way. Once the jaws 9 and 10 have clamped the sheet 3 between the molding tool, the upper and lower members 20 and 23 of the latter are closed together to grip the sheet, whereupon the knife 26 severs it. The end of the sheet is held by the jaws 9' and 10', while the longer jaws 9 and 10 continue to hold the cut-off length of the sheet. A line, not shown, supplies compressed air ("supporting air") to the recesses 24 to press the sheet 3 against the upper molding member 20, which has the heating winding 21. As soon as the molding temperature is reached at the heated portions of the sheet 3, the supporting air is withdrawn, and a line, not shown, in the upper member 20 supplies "molding air" to the upper surface of the sheet. The sheet, parts of which are plastic, is pressed into the recesses 24 and hardens on the cooled surfaces of the lower member 23.

The upper and lower members 20 and 23 are now respectively raised and lowered, leaving the length of sheet, with its molded covers 2, suspended in the jaws 9 and 10. The carriage 5 is then moved to the right, as seen in FIG. 2, so that the length of sheet is shifted to between the upper and lower members 27 and 30 of the second station, while the jaws 9' and 10' move a fresh piece of sheet to the first station.

The upper member 27 has projections 28 that correspond exactly to the shape of the covers. The projections are surrounded by heating elements 29, which can be constructed, depending upon need, either as elements that surround the entire periphery of the covers or as spot sealing elements. The lower member 30 contains recesses 31 for the filled containers 1, of which the horizontally projecting rims 1' rest on the upper face of the lower member.

Figure 6B:
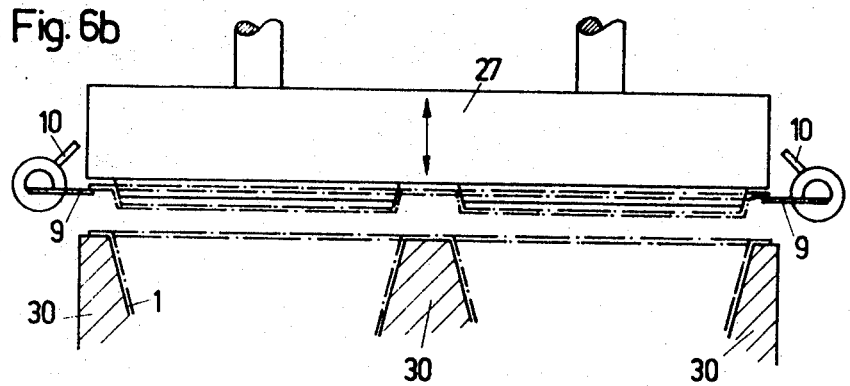
Figure 6C:
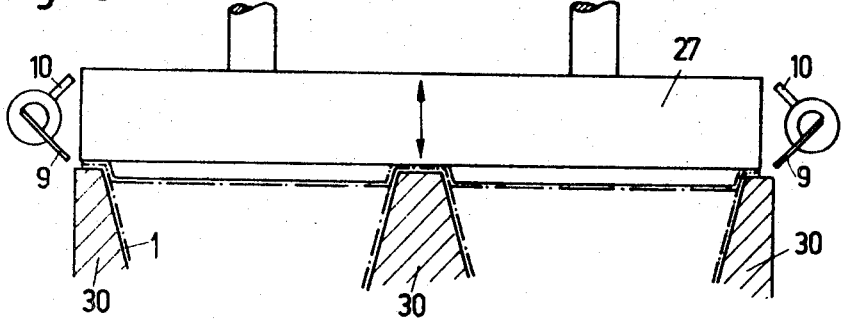

FIGS. 6a to 6c illustrate on enlarged scale three steps of the procedure for closing the containers.

As soon as a group of four connected containers 1 is moved by a conveying arrangement, not shown, along the path A to a position above the lower member 30, the table 15 is raised, so that the container rims 1' rest on the upper surface of the member 30. At the same time, the upper member 27 is lowered, the projections 28 entering the covers 1. Next, the upper jaws 10 are pivoted upwards, the length of sheet still supported by the lower jaws (see FIG. 6b). Finally, the upper member 27 is lowered further, and the jaws 9 simultaneously pivoted downwards. As a consequence, the covers 2 are pressed into the containers 1, and the cover rims are welded to the container rims 1' at every position that is heated (see FIG. 6c). During this step the jaws 9, 10 and 9', 10' are pulled back to their starting positions, at which they grasp a new length of sheet.

The upper and lower members 27 and 30 can now be respectively raised and lowered, whereupon the finished containers are advanced in a known manner.

In the figures, the heated molding member 20 and the actual mold 23 are located respectively above and below the sheet 3, as required by the shape of the desired molded cover 2. There are, however, other cover shapes for which it is necessary to reverse the positions of these members 20 and 23.

Although the preferred embodiment of the invention has been described, the scope of, and the breadth of protection afforded to, the invention are limited solely by the appended claims.

I claim:

1. In a machine for sealing containers with re-usable covers made from a sheet of thermosetting plastics material, a molding station for permanently forming said covers from said sheet of plastics material, a sealing station for applying said covers to said containers, holding means for releasably engaging said sheet, and operating means associated with said holding means for intermittently advancing said sheet, said molding station including a pair of matching dies facing each other across the path of movement of said sheet, heating means in one of said dies arranged in areas thereof facing areas of said sheet where deformation of the sheet is required in order to form the cover, the other die being shaped in conformity with the desired shape of the cover to be produced, and means for causing engagement successively between said sheet and said one die and between said sheet and the other die, whereby said areas of the sheet temporarily in engagement with the heated areas of said one die are made soft and pliable and subsequently by the temporary engagement with said other die molded to the shape thereof and brought to a permanent set, said containers being advanced to said sealing station in a direction transverse to the direction of movement of said sheet.

2. In a machine for sealing containers with re-usable covers made from a sheet of thermosetting plastics material, a molding station for permanently forming said covers from said sheet of plastics material, a sealing station for applying said covers to said containers, holding means for releasably engaging said sheet, and operating means associated with said holding means for intermittently advancing said sheet, said molding station including a pair of matching dies facing each other across the path of movement of said sheet, heating means in one of said dies arranged in areas thereof facing areas of said sheet where deformation of the sheet is required in order to form the cover, the other die being shaped in conformity with the desired shape of the cover to be produced, and means for causing engagement successively between said sheet and said one die and between said sheet and the other die, whereby said areas of the sheet temporarily in engagement with the heated areas of said one die are made soft and pliable and subsequently by the temporary engagement with said other die molded to the shape thereof and brought to a permanent set, said sealing station including a lower vertically movable member for holding said containers in an upright position and an upper vertically movable member for forcing the covers into sealing engagement with the containers, and including means common to said other die and said lower member for moving said other die and said lower member simultaneously.

References Cited
UNITED STATES PATENTS

| | | | |
|---|---|---|---|
| 3,000,157 | 9/1961 | Ollier et al. | 53—184 |
| 3,526,186 | 9/1970 | Cornelius | 53—30 X |
| 3,491,510 | 1/1970 | Sternau | 53—42 |
| 3,244,779 | 4/1966 | Levey et al. | 18—19 F X |
| 3,354,611 | 11/1967 | Powell | 53—184 |
| 3,430,411 | 3/1969 | Ollier et al. | 53—184 X |
| 1,931,434 | 10/1933 | Davis et al. | 53—296 |
| 3,358,061 | 12/1967 | Gidge et al. | 18—19 F X |

TRAVIS S. McGEHEE, Primary Examiner

H. M. CULVER, Assistant Examiner

U.S. Cl. X.R.

53—184